United States Patent [19]

Manske

[11] Patent Number: 4,620,126

[45] Date of Patent: Oct. 28, 1986

[54] HIGH ENERGY DISCHARGE SPARKGAP

[75] Inventor: Hans E. Manske, Addison, Ill.

[73] Assignee: Zenith Electronics Corporation, Glenview, Ill.

[21] Appl. No.: 625,401

[22] Filed: Jun. 28, 1984

[51] Int. Cl.[4] .......... H02H 1/04

[52] U.S. Cl. .......... 313/325; 361/129; 361/137; 361/120

[58] Field of Search .......... 313/325; 361/137, 129, 361/120

[56] References Cited

U.S. PATENT DOCUMENTS

| | | | |
|---|---|---|---|
| 3,449,614 | 6/1969 | Myers | 313/325 X |
| 3,733,522 | 5/1973 | Simovits, Jr. et al. | 361/137 |
| 4,052,639 | 10/1977 | Cunningham | 361/137 X |
| 4,438,365 | 3/1984 | Atkinson | 361/129 X |

FOREIGN PATENT DOCUMENTS

| | | | |
|---|---|---|---|
| 141103 | 5/1903 | Fed. Rep. of Germany | 361/137 |

*Primary Examiner*—David K. Moore
*Assistant Examiner*—Vincent DeLuca

[57] ABSTRACT

A "Jacob's Ladder" type spark gap for use in a television receiver or the like includes an alumina substrate having a pair of divergent wires mounted thereon for extinguishing arcs thereacross. The bottom ends of the wires are formed into plug-in terminals. Both upper and lower portions of the wires are supported in suitable apertures in the substrate and soldered to silver pads formed thereon for rigidity purposes. A flameproof housing encloses the substrate and has air vents at the bottom and is open at the top.

3 Claims, 4 Drawing Figures

HIGH ENERGY DISCHARGE SPARKGAP

BACKGROUND OF THE INVENTION

This invention relates generally to spark protection circuits and particularly to spark gaps for use in television receivers or the like.

As is well known, television receivers include cathode ray tubes (CRT's) which have closely spaced electrodes operated in an evacuated atmosphere in close proximity to very high DC potentials. In a typical television receiver, for example, the high voltage electrode in the CRT may carry a potential on the order of 25,000 volts or more. Because of the nature of CRT's and their manufacturing process, it is impossible to completely eliminate all foreign particles. Occasionally, a particle may be dislodged and cause a high voltage breakdown between electrodes in the tube. Because of the substantial capacitance in the system, a high energy arc occurs. It is therefore essential to protect the delicate circuits and components connected to the CRT electrodes, as well as some of the CRT electrodes from the effects of such high voltage discharges. It is customary to use spark gaps for this purpose.

Conventional spark gaps comprise a pair of discharge electrodes separated by an air space, with one electrode being connected to a good ground. Other types of spark gaps, such as those of the enclosed variety have also been used, but those employing air gaps have generally been preferable, both from cost and reliability standpoints.

All spark gaps are prone to deterioration and eventual failure if subjected to repeated discharges. If heavy currents begin to melt and displace metal or deposit burned materials in the arcing area, the life of the spark gap is very seriously affected. Failure of the spark gap often results in follow-through current after discharge of the arc energy, which can destroy the very circuits and components the spark gap is intended to protect. Ideally, the spark gap will be capable of carrying heavy arc currents without deterioration and be capable of rapidly dissipating the arc energy to minimize the follow through effects of the arc.

A well known arc discharge mechanism, often used in connection with utility power line equipment, is sometimes referred to as the "Jacob's Ladder", because of its climbing effect in "blowing" out the arc. With it a pair of heavy electrodes or "arcing horns" is positioned in divergent relationship to each other. Thus, at their lower portions where the arc is initiated, they are fairly close to each other whereas at their upper portions they are much farther apart. The horns are oriented in the vertical direction so that the heated gases generated by the arc in the air tends to force or blow the arc upward along the diverging arcing horns until a point is reached where the arc cannot sustain itself because of the arc length between the arcing points. A similar arrangement is used in power line switches, for example where there is usually a very substantial residual current that is interrupted when a switch is opened. In that environment, the arcing horns protect the switch contacts by carrying the residual current when the switch is opened. Thereafter, depending upon the design, the horns are drawn apart by continued movement of the switch parts and the "Jacob's Ladder" effect may be used to help extinguish the arc.

The invention consists of a "Jacob's Ladder" arrangement in a very convenient and attractive spark gap for use in television receivers or the like.

OBJECTS OF THE INVENTION

A principal object of the invention is to provide a novel spark gap for use in a television receiver or the like.

Another object of the invention is to provide a small high energy spark gap of novel construction.

SUMMARY OF THE INVENTION

In accordance with the invention a spark gap of the "Jacob's Ladder" type includes a pair of wires arranged in spaced, divergent relationship for extinguishing arcs developed thereacross and includes means supporting the wires on an insulating substrate and means for mounting the substrate in an upright position.

BRIEF DESCRIPTION OF THE DRAWINGS

These and other objects and advantages of the invention will become apparent by reading the following description thereof in conjunction with the drawing in which.

DESCRIPTION OF THE PREFERRED EMBODIMENT

Figure 1:
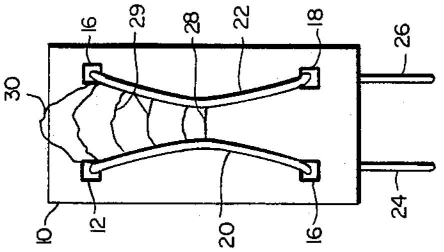
FIG. 1 is a plan view of a spark gap constructed in accordance with the invention.

In FIG. 1, a generally rectangular insulating substrate 10 is shown with a pair of convergent-divergent wires 20 and 22 mounted thereon. The exact shape of the wires is not critical except that their point of closest proximity must be at the base of the divergent pair. Substrate 10 may be made of alumina, silica or other high temperature insulating material and may have height, width and thickness dimensions of approximately 2"×1"×1/32". The wires are secured in suitably positioned apertures in substrate 10 which apertures are surrounded by metallized areas 12, 14, 16 and 18. With silica or alumina substrates these areas are preferably metallized with silver and the appropriate portions of the wires soldered thereto for purposes of rigidity. It will be appreciated that, due to the size and limited strength of the wires used in the spark gap of the invention, the upper ends of the wires should be rigidly supported because of the fairly significant shock forces imposed thereon during arcing.

Figure 2:
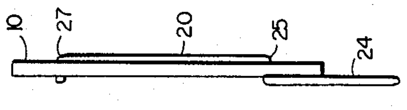
FIG. 2 is a side view of the spark gap of FIG. 1.

As best seen in FIG. 2, the wires are bent as shown at 25 and 27 to pass through substrate 10 with the lower portion of the wires being downwardly formed into terminal ends 24 and 26. The wire ends may be formed and treated to enable them to be plugged directly into suitable socket connectors (not shown) or appropriate plug-in terminals may be attached to the ends. The closest distance between wires 20 and 22 is denoted by line 28 and represents the area where any arcing should commence. The increasingly outwardly curved lines 29 represent arc path contours as the air is broken down by the arc and the heated gases tend to blow the arc up along the diverging arms of the "Jacob's Ladder". Path 30 represents the contour of arc path at about the point where the arc path length is too long for the arc to be sustained and hence beyond which it will be extinguished. The time period required to traverse the "Jacob's Ladder" is very short, and contributes to its desirability because the arc is extinguished quite rapidly.

Figure 3:
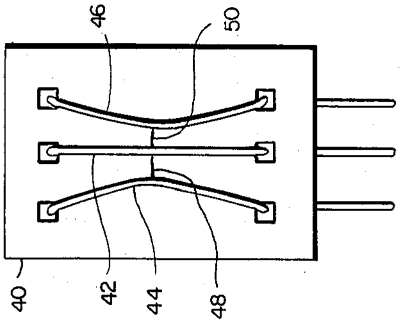
FIG. 3 is a plan view of a double spark gap constructed in accordance with the invention.
Figure 4:
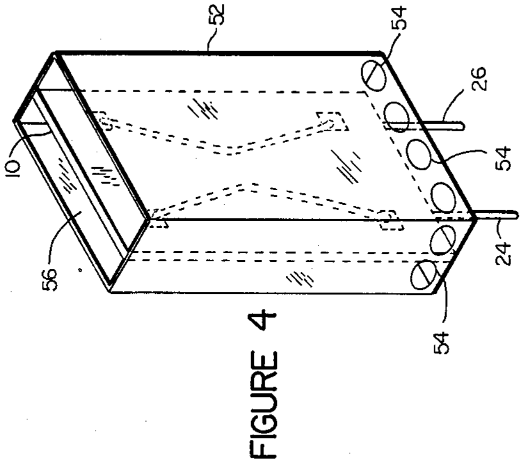
FIG. 4 is a perspective view showing the spark gap of FIG. 1 mounted in a protective housing.

FIG. 3 is a variation showing two spark gaps on a single substrate. Here, the center wire 42 is straight with the two outer wires 44 and 46 being divergently arranged with respect to the center wire. The critical spark gap dimensions are indicated by lines 48 and 50. As shown, they are of different dimension. This of course is a matter of choice, depending upon the particular application desired.

While the spark gap may be used as shown, in practice it will be enclosed in a flameproof housing. The housing not only helps protect the structure from foreign matter contamination and interference, but also shields the surrounding environment from any arc effects. Since the spark gap requires air, the housing should be arranged to provide a "chimney" effect. As illustrated, substrate 10 is enclosed in a generally rectangular housing 52 that includes a plurality of ventilating apertures 54 along its lower portion. The top 56 of the housing and its bottom (not shown) are open. Since the bottom of the enclosure may rest on a printed circuit board or the like, ventilating apertures 54 assure an adequate supply of air for the extinguishing action of the spark gap to occur.

Tests of the spark gap under repeated arcing have shown its superior durability over the air gap types discussed above. Repeated arcing did not result in material being deposited on the substrate which is, as mentioned above, a prime factor contributing to the deterioration of a spark gap. Because of its rapid action in extinguishing an arc, the spark gap is also effective in preventing follow-through current flow.

What has been described is a novel spark gap for use in a television receiver or the like. It is recognized that numerous modifications and changes in the described embodiment of the invention will be apparent to those skilled in the art without departing from the true spirit and scope thereof. The invention is to be limited only as defined in the claims.

What is claimed is:

1. A spark gap for use in a television receiver or the like comprising:

an insulating high temperature substrate defining a plurality of support apertures;

a pair of divergent wires rigidly mounted to said substrate by means of said support apertures;

means for plug-in mounting of said substrate in an upright position with the diverged ends of said wires uppermost; and a flameproof housing surrounding said substrate, said housing including a ventilation opening near the bottom thereof and being substantially open at the top thereof for providing a chimney effect.

2. The spark gap of claim 1 further including plated areas on said substrate around at least the uppermost ones of said apertures for soldering said upper ends of said wires.

3. The spark gap of claim 2 further including an additional wire positioned on said substrate with respect to one of said two wires for forming a second spark gap with said one wire.

* * * * *